United States Patent [19]

Dickey

[11] Patent Number: 5,270,858
[45] Date of Patent: * Dec. 14, 1993

[54] D.C. REACTIVELY SPUTTERED ANTIREFLECTION COATINGS

[76] Inventor: Eric R. Dickey, 18155 NW. Cambray St, Beaverton, Oreg. 97006

[*] Notice: The portion of the term of this patent subsequent to Apr. 14, 2009 has been disclaimed.

[21] Appl. No.: 755,669

[22] Filed: Sep. 6, 1991

Related U.S. Application Data

[63] Continuation-in-part of Ser. No. 595,552, Dec. 11, 1990, Pat. No. 5,105,310.

[51] Int. Cl.$^5$ ............................................. G02B 1/10
[52] U.S. Cl. .................... 359/586; 359/580; 359/582; 359/585
[58] Field of Search ............... 359/580, 581, 586, 589

[56] References Cited

U.S. PATENT DOCUMENTS

| | | | |
|---|---|---|---|
| 2,478,385 | 8/1949 | Gaiser | 359/580 |
| 3,432,225 | 5/1964 | Rock | 350/164 |
| 3,565,509 | 2/1971 | Sulzbach | 350/164 |
| 3,604,784 | 9/1971 | Louderback et al. | 350/164 |
| 3,781,090 | 12/1973 | Sumita | 350/164 |
| 3,960,441 | 6/1976 | Kamiya et al. | 350/164 |
| 4,012,119 | 3/1977 | Adams et al. | 359/589 |
| 4,313,647 | 2/1982 | Takazawa | 359/581 |
| 4,317,844 | 3/1982 | Carlson | 204/164 |
| 4,419,533 | 12/1983 | Czubatyj et al. | 136/259 |
| 4,714,308 | 12/1987 | Sawamura et al. | 359/589 |
| 4,778,731 | 10/1988 | Kraatz et al. | 359/580 |
| 4,997,241 | 3/1991 | Muratomi | 359/589 |
| 5,007,710 | 4/1991 | Nakajima et al. | 359/589 |
| 5,091,244 | 2/1992 | Biornard | 359/589 |
| 5,105,310 | 4/1992 | Dickey | 359/586 |

OTHER PUBLICATIONS

"Three-Layered Reflection-Reducing Coatings", Lockhart, L. and King, P., J. Opt. Soc. Am., vol. 37, pp. 689-694 (1947).

*Primary Examiner*—Bruce Y. Arnold
*Assistant Examiner*—John Juba

[57] ABSTRACT

A multilayer antireflection coating designed for deposition in in-line coating machines by DC reactive sputtering. About half of the total thickness of the coating may be formed from zinc oxide which has a high sputtering rate. Conductive transparent materials including aluminum doped zinc oxide, antimony doped tin oxide, cadmium tin oxide, and indium tin oxide may be included in the coating.

16 Claims, 4 Drawing Sheets

D.C. REACTIVELY SPUTTERED ANTIREFLECTION COATINGS

This application is a continuation-in-part of application Ser. No. 07/595,552 filed Oct. 11, 1990, now U.S. Pat. No. 5,105,310.

BACKGROUND OF THE INVENTION

The present invention relates generally to multilayer antireflection coatings for substrates, and more particularly to multilayer antireflection coatings deposited on transparent substrates by sputtering.

The simplest antireflection coating is a single layer of a transparent material having a refractive index less than that of a substrate on which it is disposed. The optical thickness of such a layer may be about one-quarter wavelength at a wavelength of about 520 nanometers (nm), i.e., at about the middle of the visible spectrum. The visible spectrum extends from a wavelength of about 420 nm to a wavelength of about 680 nm. A single layer coating produces a minimum reflection value at the wavelength at which the layer's optical thickness is one-quarter of the wavelength. At all other wavelengths the reflection is higher than the minimum but less than the reflection of an uncoated substrate. An uncoated glass surface having a refractive index of about 1.52 reflects about 4.3 percent of the normally-incident light. Coating the substrate with a layer of magnesium fluoride ($MgF_2$) having a refractive index of about 1.38 produces a minimum reflection of about 1.3 percent.

Multilayer antireflection coatings are made by depositing two or more layers of transparent dielectric materials on a substrate. At least one layer has a refractive index higher than the refractive index of the substrate. The layer systems usually include at least three layers and are designed to reduce reflection at all wavelengths in the visible spectrum. Multilayer antireflection coatings may yield reflection values of less than 0.25 percent over the visible spectrum.

Most multilayer antireflection coatings are derived from a basic three layer system. The first or outermost layer of this system has a refractive index lower than that of the substrate and an optical thickness of about one-quarter wavelength at a wavelength of about 520 nm. The second or middle layer has a refractive index higher than that of the substrate and an optical thickness of about one-half wavelength at a wavelength of about 520 nm. The third layer, i.e. the layer deposited on the substrate, has a refractive index greater than that of the substrate but less than that of the second layer. The optical thickness of the third layer is also about one-quarter wavelength at a wavelength of about 520 nm. This basic design was first described in the paper by Lockhart and King, "Three Layered Reflection Reducing Coatings", *J. Opt. Soc. Am.*, Vol. 37, pp. 689-694 (1947).

A disadvantage of the Lockhart and King system is that the refractive indices of the layers must have specific values in order to produce optimum performance. The selection and control of the refractive index of the third layer is particularly important. Deviation from specific refractive index values can not be compensated for by varying the thickness of the layers.

Various modifications of the Lockhart and King system have been made to overcome these disadvantages. For example, the layer system has been modified by forming at least one layer from mixtures of two materials having refractive indices higher and lower than the desired value for the layer. The refractive index of one or more layers has also been simulated by using groups of thinner layers having about the same total optical thickness as the desired layer, but including layers having refractive index values higher and lower than the desired value.

Other modifications have included varying the refractive index of one or more of the layers as a function of thickness, i.e., having the refractive index of a layer inhomogeneous in the thickness direction. This approach is described in U.S. Pat. No. 3,960,441. Another modification is the use of an additional layer between the basic three layer system and the substrate. This additional layer may have an optical thickness of about one-half wavelength, i.e., about half the thickness of the basic system, and a refractive index less than that of the substrate. This modification is disclosed in U.S. Pat. No. 3,781,090.

The layer systems discussed above are generally deposited by thermal evaporation. In thermal evaporation, the time required to deposit the layers may be only a relatively small fraction of the total production time. The production time may be determined by such factors as pump down time for the coating chamber, the time required to heat substrates to process temperatures, and the time required to cool substrates after coating. The number of layers in the coating, the thickness of the layers, and the layer materials may not have a significant influence on production time and thus cost.

DC reactive sputtering is the process most often used for large area commercial coating applications. For example, this process may be carried out in a glass coater or in-line system to deposit thermal control coatings for architectural and automobile glazings. In the glass coater, the articles to be coated are passed through a series of in-line vacuum chambers, each including sputtering sources, i.e., sputtering cathodes. The chambers are isolated from one another by vacuum locks.

The time taken to deposit the layers is determined mainly by the number of layers and the sputtering rate of the materials. The use of a glass coater to deposit multilayer antireflection coatings can significantly reduce their cost, extending their range of application.

Many of the materials used in thermal evaporation processes, particularly fluorides and sulfides, are not easily sputtered. Conversely, a few materials, such as zinc oxide (ZnO), commonly used in the architectural glass sputtering systems are rarely, if ever used, in thermal evaporation processes. The sputtering rate of different materials may vary by a factor of greater than twenty. The choice of materials, therefore, can have a significant influence on the deposition time and fabrication cost. In an in-line sputtering system with multiple chambers, each chamber may be set up to deposit one specific material. As such, the number of layers that can be deposited is determined by the number of chambers. A coating designed for sputter deposition should therefore be as simple as possible.

It should also be made, if possible, from materials which have a high sputtering rate.

A simple improvement on the Lockhart and King system, which may be suitable for in-line sputtering, is described in U.S. Pat. No. 3,432,225, the entire disclosure of which is hereby incorporated by reference. This system, called the Rock system, includes four layers. The first or outermost layer has a refractive index lower than that of the substrate and an optical thickness of about one-quarter wavelength at a wavelength of about 520 nm. The second or middle layer has a refractive index higher than that of the substrate and an optical thickness of about one-half to sixth-tenths of a wavelength at a wavelength of about 520 nm. The third layer has an optical thickness of about one-tenth of a wavelength at a wavelength of 520 nm and a refractive index less than that of the second layer. The fourth layer has an optical thickness of about one-tenth of a wavelength and a refractive index greater than the second layer and the substrate. The third layer may be the same material as the first layer, and the fourth layer may be the same material as the second layer.

Even though the Rock system is somewhat similar to the Lockhart and King system, in that it has about the same total optical thickness, it functions in a unique way. Specifically, for a selected set of materials, the layer thicknesses of the Rock system may be adjusted to provide optimum performance. Specific refractive index values for the layers are not required. However, in order to obtain a low reflection value, for example less than 0.5 percent across the entire visible spectrum, the refractive index of the first and third layers should be less than about 1.5, and the refractive index of the second and fourth layers should be greater than about 2.2. A Rock system suitable for sputtering may use silicon dioxide ($SiO_2$) for the first and third layers, and titanium dioxide ($TiO_2$) for the second and fourth layers.

The Rock system is simple as it has only four layers. However, since it requires a relatively high refractive index material, such as titanium dioxide, a high sputtering rate is difficult to obtain. Typically, the deposition rate for titanium dioxide reactively sputtered from titanium is only one-quarter that of silicon dioxide reactively sputtered from silicon. For a Rock system using titanium dioxide and silicon dioxide, the deposition of titanium oxide would take about four times longer than the deposition of silicon dioxide.

Certain materials with refractive indices less than about 2.2 have relatively high sputtering rates. For example, zirconium dioxide ($ZrO_2$) can be deposited about twice as fast as titanium dioxide, tin oxide ($SnO_2$) about ten times faster than titanium dioxide, and zinc oxide (ZnO) about fifteen times faster than titanium dioxide. Zirconium oxide has a refractive index of about 2.1, tin oxide of about 2.0 and zinc oxide of about 2.0.

Another reason for including a significant thickness of a material such as zinc oxide or tin oxide in an antireflection coating is to cause the coating to be electrically conductive. Zinc oxide may be made conductive by doping it with aluminum, and tin oxide may be made conductive by doping it with antimony. The refractive index of the doped materials remains about 2.0. Other transparent conductive materials having a refractive index of about 2.0 include Cadmium Tin Oxide (Cadmium Stannate) and Indium Tin Oxide (ITO).

A further advantage of using a high sputtering rate material in an antireflection layer system designed for deposition in an in-line sputtering system is energy savings. An-in line system of the type used for architectural glass coating my consume electrical power at a rate of several hundred kilowatts (KW). Thus a shorter time taken to deposit a layer system may result in significantly less energy being consumed, provided that increased deposition rate may be achieved without a significant increase in power consumption.

Figure 1:
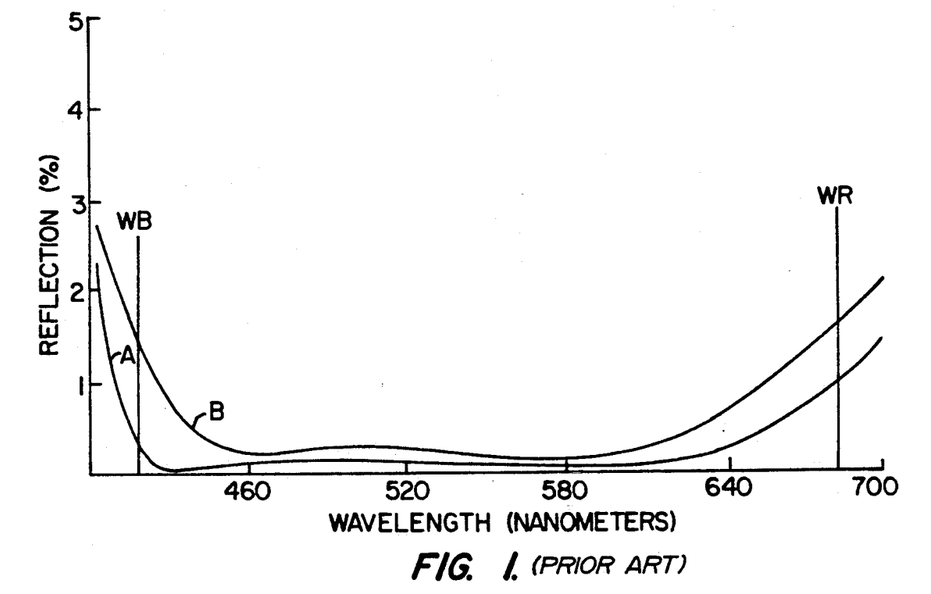
FIG. 1 graphically illustrates reflectance as a function of wavelength for a four layer system.

A problem with using high sputtering rate materials or transparent conductive materials for the Rock system is illustrated by FIG. 1. Curve A shows the reflection values, as a function of wavelength, for a system incorporating titanium dioxide and silicon dioxide layers. The layer sequence and thickness are shown in Table 1. The layer thickness is described as fractions of a wavelength at a wavelength $\lambda_0$, which is known as the center wavelength or the design wavelength.

TABLE 1

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | $0.2148\lambda_0$ |
| 2 | $TiO_2$ | 2.35 | $0.5204\lambda_0$ |
| 3 | $SiO_2$ | 1.46 | $0.1022\lambda_0$ |
| 4 | $TiO_2$ | 2.35 | $0.0567\lambda_0$ |
|  | Glass | 1.52 | Substrate |

Curve B shows the reflection values for a system in which zinc oxide, instead of titanium oxide, is used for the second layer. The layer thicknesses were modified slightly to obtain optimum result with the new combination of materials. The layer sequence and thickness are shown in Table 2.

TABLE 2

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | $0.2369\lambda_0$ |
| 2 | ZnO | 2.01 | $0.3959\lambda_0$ |
| 3 | $SiO_2$ | 1.46 | $0.0771\lambda_0$ |
| 4 | $TiO_2$ | 2.35 | $0.0441\lambda_0$ |
|  | Glass | 1.52 | Substrate |

As shown, the structure of Table 2 provides antireflection performance (curve B) over a narrower spectral region than the structure of Table 1 (curve A). This is evident from the higher reflectivity at the extremes of the visible spectrum at about 420 nm (WB) and 680 nm (WR). The reflectivity of the Table 2 structure (curve B) in the spectral range from 460 to 640 nm is two to three times higher than the Table 1 structure (curve A). Thus, the higher production rate produced by using zinc oxide instead of titanium oxide is only accomplished at the expense of a significant reduction in performance.

It is an object of the present invention to provide an antireflection system for economical, high volume production in an in-line reactive sputtering apparatus.

It is another object of the present invention to provide an antireflection coating with a performance comparable to the Rock system but wherein only about one-quarter of the total optical thickness of the coating includes a material having an index of refraction greater than about 2.2.

It is a further object of the present invention to provide an antireflection coatings which may use a material having a refractive index of about 2.0 for the thickest, high refractive index layer.

It is yet another object of the present invention to provide an antireflection coating wherein at least the material used to form the thickest, high refractive index layer has a sputtering rate about ten times faster than that of titanium dioxide.

It is still another object of the present invention to provide an antireflection coating which has no more than five layers and wherein the total optical thickness is less than or equal to about one wavelength at a wavelength between about 480 nm to 560 nm.

It is yet a further object of the present invention to provide an antireflection coating which may electrically conductive.

It is still another object of the present invention to provide an antireflection coating which may be produced with significantly reduced energy consumption.

SUMMARY OF THE INVENTION

The present invention comprises an antireflection coating having a system of five layers. The layers are designated the first, second, third, fourth and fifth in consecutive numerical order beginning with the layer farthest from the substrate. The first layer has a refractive index lower than the substrate and an optical thickness of about 0.25 $\lambda_0$. The second layer has a refractive index greater than about 2.20 and an optical thickness less than about 0.25 $\lambda_0$. The third layer has a refractive index less than the second layer and an optical thickness between about 0.25 $\lambda_0$ and 0.5 $\lambda_0$. The fourth layer has a refractive index less than the third layer and has an optical thickness less than about 0.25 $\lambda_0$. The fifth layer has a refractive index greater than the substrate and greater than the fourth layer. The optical thickness of the fifth layer is less than about 0.25 $\lambda_0$. The $\lambda_0$, the design wavelength, is between about 480 nm and 560 nm.

The system may comprise first, second, third, fourth and fifth layers made from silicon dioxide, titanium dioxide, zinc oxide, silicon dioxide, and titanium dioxide, respectively. The system may provide a photopic reflection of less than 0.25 percent as deposited on a transparent substrate having a refractive index of about 1.52. The system may be produced about two times faster than a four layer system having substantially the same optical performance, but wherein the first, second, third, and fourth layers are made from silicon dioxide, titanium dioxide, silicon dioxide and titanium dioxide, respectively.

The system may include as a third layer, instead of zinc oxide, a transparent conductive material. The transparent conductive material may be selected from the group consisting of aluminum doped zinc oxide, antimony doped tin oxide, cadmium tin oxide, and indium tin oxide.

BRIEF DESCRIPTION OF THE DRAWINGS

The accompanying drawings, which are incorporated in and constitute a part of the specification, schematically illustrate, among other things, embodiments of the present invention and together with the general description given above and the detailed description of the embodiments given below serve to explain the principles of the invention.

DETAILED DESCRIPTION OF THE INVENTION

Figure 2:
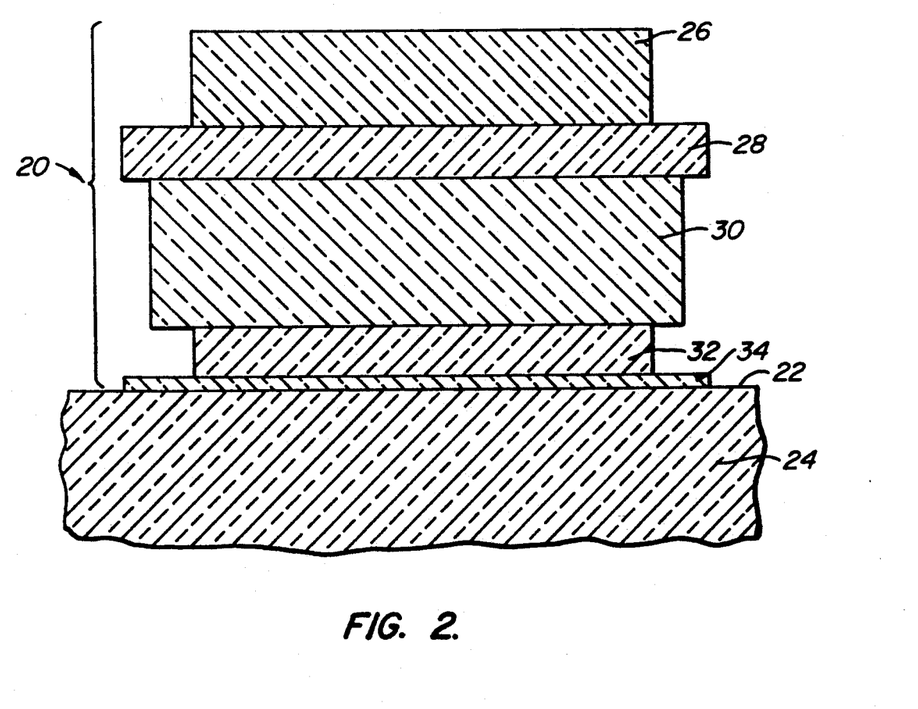
FIG. 2 schematically illustrates the five layer system of the present invention.

As shown in FIG. 2, wherein like reference numerals refer to like components throughout the various figures, the five layer system 20 of the present invention includes layers 26, 28, 30, 32, and 34. The system may be deposited on a surface 22 of a transparent substrate 24. As discussed in detail below, system 20 may be modified by adding one or more layers to accommodate different materials.

The thickness of layers 26, 28, 30, 32, and 34 are described in terms of their optical thickness. The optical thickness is the mathematical product of a layer's physical thickness and its refractive index. The optical thickness is described as a fraction of a wavelength $\lambda_0$ which is known to those skilled in the art as the design wavelength or the center wavelength. In the present invention, $\lambda_0$ may be some wavelength in the range from about 480 nm to 560 nm, corresponding approximately to the middle of the visible spectrum. The selection of the specific design wavelength will depend on the range of wavelengths over which the coating must be effective.

The first or outermost layer 26 of system 20 has a similar function to the first layer in the Rock system. Layer 26 should have a refractive index less than the refractive index of the substrate, and it may have an optical thickness of about one-quarter wavelength at the design wavelength of choice. The fourth and fifth layers 32 and 34, respectively, have a similar function to the third and fourth layers of the Rock system. The individual thickness of fourth and fifth layers 32 and 34, respectively, may not be greater than about one-quarter wavelength at the design wavelength. Their combined thickness may be about one-quarter wavelength at the design wavelength. The refractive index of fifth layer 34 must be higher than the refractive index of the substrate 24, and the refractive index of fourth layer 32 must be less than that of fifth layer 34.

The relative thickness and the refractive index relationship of second and third layers 28 and 30, respectively, are critical to the present invention. The combined optical thickness of layers 28 and 30 is preferably about one-half wavelength at the design wavelength. The refractive index of second layer 28 must be greater than the refractive index of third layer 30. The refractive index of third layer 30 must be greater than the refractive index of fourth layer 32. The optical thickness of second layer 28 is less than one-quarter wavelength at the design wavelength. The optical thickness of third layer 30 is greater than one-quarter wavelength but less than about one-half wavelength at the design wavelength.

The present invention has been described in terms of a relative refractive index sequence and an optical thickness range. The exact thickness of the layers will depend on the materials used and the performance desired.

A specific example of system 20 is described below. The material forming layers 26 and 32 is silicon dioxide ($SiO_2$) which has a refractive index of about 1.46. Titanium dioxide ($TiO_2$) was used to form layers 28 and 34, and it has a refractive index of about 2.35. Zinc oxide was used to form third layer 30. It has a refractive index of about 2.0. The refractive index of a glass substrate was assumed to be about 1.52.

The refractive index data for system 20 was obtained from measurements of actual layers deposited by reactive sputtering in an in-line sputtering system. However, different methods of deposition for a selected layer material may produce different refractive index values. Different refractive index values may be accommodated by changing the thickness of one or more of the layers. The performance goal of all embodiments discussed below was to be as close as possible to zero reflectivity over the wavelength range from about 425 to 675 nm. The layer sequence and optical thicknesses are shown in Table 3. The design wavelength $\lambda_0$ was about 510 nm. The total optical thickness of titanium oxide for this embodiment is about 0.138 $\lambda_0$, which is about one-quarter of the thickness of titanium dioxide in the four layer system of Table 2.

TABLE 3

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | 0.2657$\lambda_0$ |
| 2 | $TiO_2$ | 2.35 | 0.1104$\lambda_0$ |
| 3 | ZnO | 2.01 | 0.3684$\lambda_0$ |
| 4 | $SiO_2$ | 1.46 | 0.1169$\lambda_0$ |
| 5 | $TiO_2$ | 2.35 | 0.0278$\lambda_0$ |
|  | Glass | 1.52 | Substrate |

Figure 3:
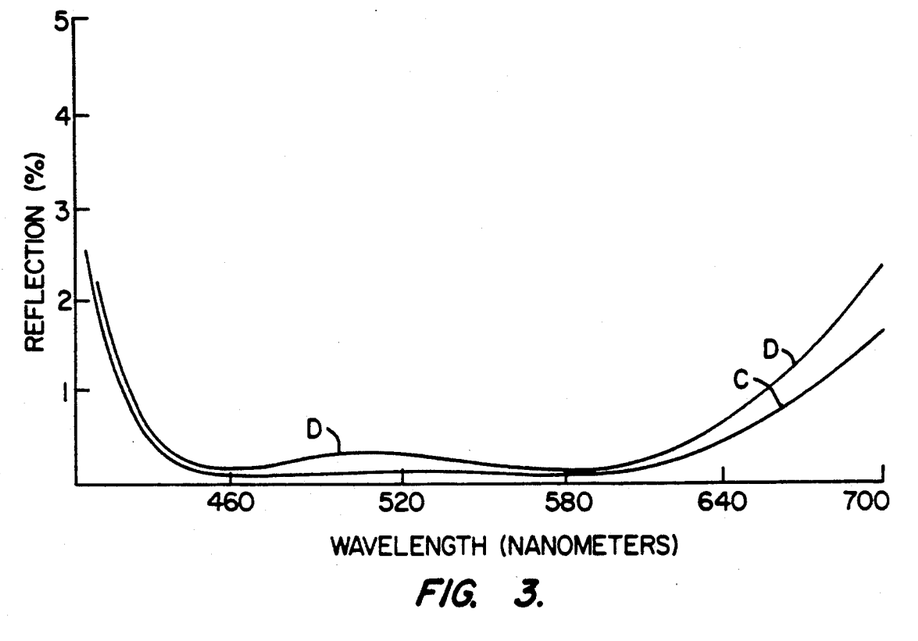
FIG. 3 graphically illustrates reflection as a function of wavelength for the five layer system of the present invention and a four layer system of the prior art.

The computed performance of the embodiment of Table 3 is shown by curve C of FIG. 3. The reflectivity level for wavelengths longer than about 450 nm is essentially the same as the Rock system shown in FIG. 1 (curve A).

Curve D in FIG. 3 is the computed performance of a four layer Rock system in which the second layer has a refractive index of about 2.085 at the design wavelength. The index 2.085 was computed as the refractive index of a mixture of titanium dioxide and zinc oxide in proportions to the mechanical thickness of this second and third layers of Table 1. The details of the layer system are shown in Table 4.

TABLE 4

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | 0.2349$\lambda_0$ |
| 2 | $TiO_2$/ZnO mixture | 2.085 | 0.4129$\lambda_0$ |
| 3 | $SiO_2$ | 1.46 | 0.0682$\lambda_0$ |
| 4 | $TiO_2$ | 2.35 | 0.0492$\lambda_0$ |
|  | Glass | 1.52 | Substrate |

A comparison of curves C and D of FIG. 3 indicates that the five layer system is superior in the performance to the four layer Rock system. Thus, the second and third layers of the present invention do more than simply simulate a single layer with some intermediate refractive index.

Figure 4:
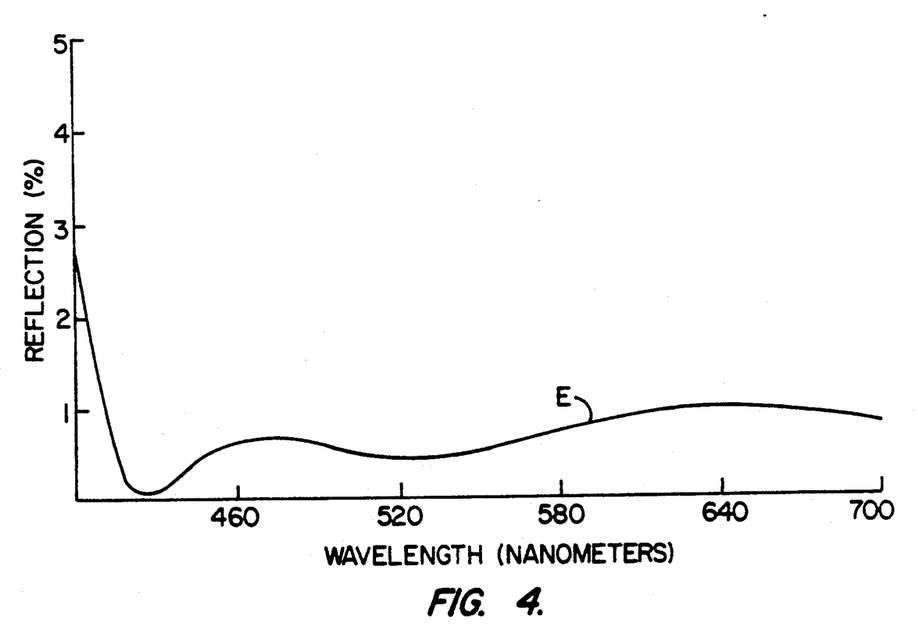
FIG. 4 graphically illustrates reflection as a function of wavelength for a five layer system of the present invention in which the refractive index sequence of the second and third layers are inverted from that of FIG. 3.

The importance of the refractive index relationship of the second and third layers of the system of the present invention is highlighted by the following embodiment. Here, the second and third layers of the embodiment of Table 3 have been interchanged such that the layer having the highest refractive index is the third layer. This layer system is shown in detail in Table 5. The layer thicknesses have also been slightly modified to obtain the optimum performance for the materials used. The performance of this system is shown in FIG. 4 (curve E). It does not satisfy the performance goal described above which is a photopic reflection of less than about 0.25 percent. This example illustrates that the positioning of the thin titanium oxide layer and the thicker lower index layer is a critical feature of the present invention.

TABLE 5

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | 0.2614$\lambda_0$ |
| 2 | ZnO | 2.01 | 0.4751$\lambda_0$ |
| 3 | $TiO_2$ | 2.35 | 0.0729$\lambda_0$ |
| 4 | $SiO_2$ | 1.46 | 0.1202$\lambda_0$ |
| 5 | $TiO_2$ | 2.35 | 0.0592$\lambda_0$ |
|  | Glass | 1.52 | Substrate |

The five layer antireflection system of the present invention is a unique system which functions differently from the prior art systems. Its optical performance may be comparable to or slightly inferior to some prior art systems. The system has the advantage, however, that acceptable performance may be realized with a layer system wherein the major portion of the high refractive index material is a material such as tin oxide or zinc oxide or a transparent electrically conductive material such as aluminum doped zinc oxide, antimony doped tin oxide, cadmium tin oxide (cadmium stannate) or indium tin oxide (ITO). Such materials may have sputtering rates ten to fifteen times higher than a material such as titanium dioxide. Layer systems according to the present invention may be produced in in-line sputtering systems at a rate at least about two times faster than comparable prior art systems.

Another embodiment of the present invention uses a material for the third layer with has a refractive index greater than zinc oxide. Zirconium dioxide, for example, has a refractive index of about 2.1 but can be sputtered at only about one-fifth the rate for zinc oxide. Details of a system using zirconium dioxide are provided in Table 6.

TABLE 6

Figure 5:
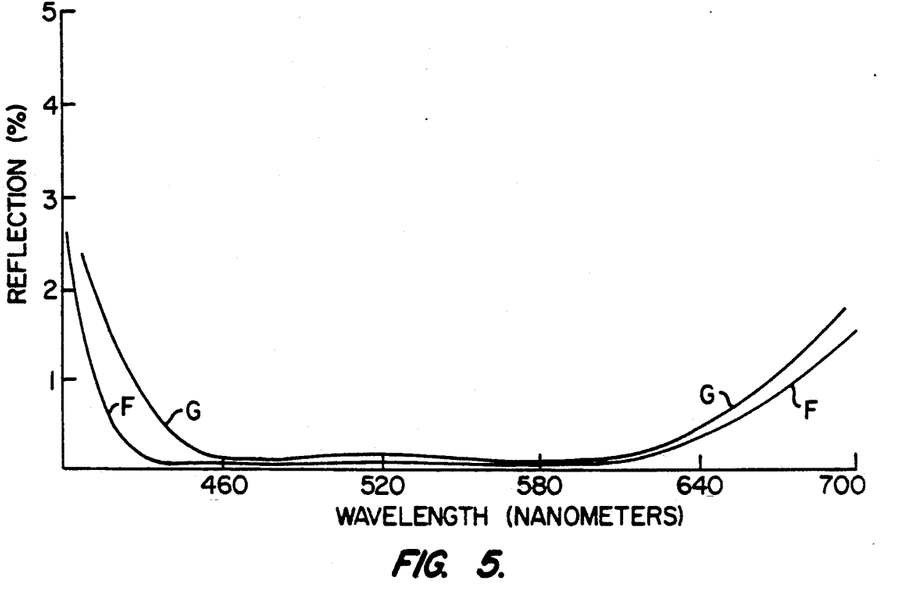
FIG. 5 graphically illustrates reflection as a function of wavelength of another embodiment of the present invention and a four layer system of the prior art.

| Layer | Material | Refractive Index @ 510 nm | Optical Thickness $\lambda_0$ = 510 nm |
|---|---|---|---|
|  | Air | 1.0 | Entrance Medium |
| 1 | $SiO_2$ | 1.46 | 0.2551$\lambda_0$ |
| 2 | $TiO_2$ | 2.35 | 0.1388$\lambda_0$ |
| 3 | $ZrO_2$ | 2.14 | 0.3651$\lambda_0$ |
| 4 | $SiO_2$ | 2.35 | 0.1220$\lambda_0$ |
| 5 | $TiO_2$ | 2.35 | 0.0394$\lambda_0$ |
|  | Glass | 1.52 | Substrate |

The performance of the system of Table 6 is shown in FIG. 5 (curve F). As can be seen, the performance is almost identical to that of the system of Table 1 (see curve A of FIG. 1). The gain in sputtering rate, however, would be less than a factor of two because of the relatively low sputtering rate of zirconium oxide.

As a further comparison, the performance of a four layer Rock system with a second layer of tantalum oxide ($Ta_2O_5$) having a refractive index of about 2.2 is also shown (curve G) in FIG. 5. Tantalum oxide has a sputtering rate about 1.5 times that of titanium dioxide. The details of this system are shown in Table 7. A mixture of $TiO_2$ and $ZrO_2$, in proportions of the thicknesses given for the second and third layers of Table 6, would have a refractive index of about 2.19, i.e. about the same as tantalum oxide.

TABLE 7

| Layer | Material | Refractive Index @ 510 nm | Optical Thickness $\lambda_0 = 510$ nm |
| --- | --- | --- | --- |
|  | Air | 1.0 | Entrance Medium |
| 1 | $SiO_2$ | 1.46 | $0.2404\lambda_0$ |
| 2 | $Ta_2O_5$ | 2.21 | $0.4441\lambda_0$ |
| 3 | $SiO_2$ | 1.46 | $0.0706\lambda_0$ |
| 4 | $TiO_2$ | 2.35 | $0.0518\lambda_0$ |
|  | Glass | 1.52 | Substrate |

As can be seen from curves F and G, the five layer system has a superior performance to the four layer system. This further exemplifies that the present invention does more than use two layers to simulate a layer of an intermediate refractive index.

Figure 6:
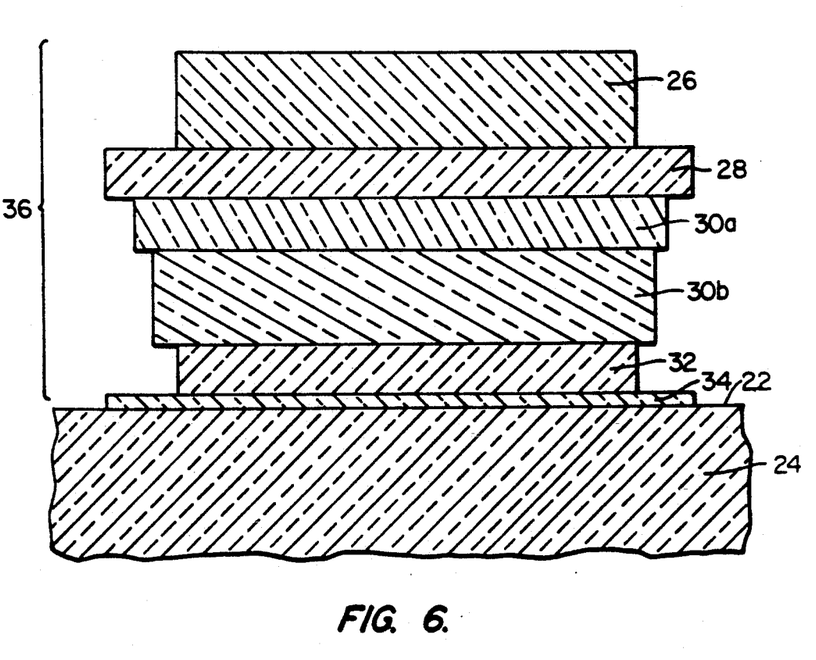
FIG. 6 schematically illustrates a six layer embodiment in accordance with the present invention.

Another embodiment of the present invention comprises replacing the third layer of the embodiment of FIG. 2 with two sub-layers to form a six layer system. As shown in FIG. 6, the six layer system 36 uses layers 30a and 30b in place of layer 30 of system 20. The combined optical thickness of layers 30a and 30b may be up to about twenty percent greater than the optical thickness of layer 30. The combined optical thickness of layers 28, 30a and 30b will be about one-half wavelength at the design wavelength $\lambda_0$. For most examples, the total optical thickness will be between about 0.45 and 0.55 wavelengths at the design wavelength.

Except for the layers 30a and 30b, system 36 is similar in almost all respects to system 20 of FIG. 2. The sub-layer 30a has a lower refractive index than that of second layer 26. The sub-layer 30b has a higher refractive index than that of fourth layer 32, and a lower refractive index than that of sub-layer 30a. The actual thickness of layers 30a and 30b, and the other layers in the system will depend on the materials used and the optical performance desired. This embodiment may be useful, for example, to provide a compromise between high sputtering rate and good antireflection performance.

Details of the six layer embodiment of the present invention are given in Table 8. Zirconium dioxide ($ZrO_2$) and zinc oxide (ZnO) are used to form layers 30a and 30b, respectively.

TABLE 8

| Layer | Material | Refractive Index @ 510 nm | Optical Thickness $\lambda_0 = 510$ nm |
| --- | --- | --- | --- |
|  | Air | 1.0 | Entrance Medium |
| 1 | $SiO_2$ | 1.46 | $0.2678\lambda_0$ |
| 2 | $TiO_2$ | 2.35 | $0.0718\lambda_0$ |
| 3 | $ZrO_2$ | 2.14 | $0.1698\lambda_0$ |
| 4 | ZnO | 2.01 | $0.2702\lambda_0$ |
| 5 | $SiO_2$ | 1.46 | $0.1204\lambda_0$ |
| 6 | $TiO_2$ | 2.35 | $0.0298\lambda_0$ |
|  | Glass | 1.52 | Substrate |

Figure 7:
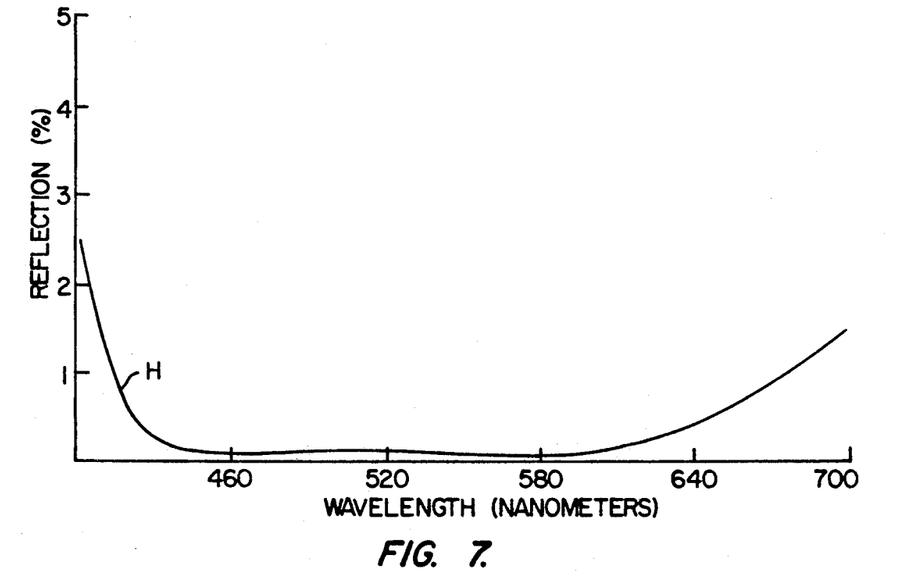
FIG. 7 graphically illustrates reflectance as a function of wavelength for a six layer system in accordance with the present invention.

The performance of this system is represented by curve H of FIG. 7. The deposition speed of this system may be faster than the deposition speed of the system of Table 6 because of the replacement of more than half of the zirconium oxide layer with zinc oxide and the reduction in the thickness of the titanium dioxide layer. The combined optical thickness of the second, third and fourth layers of the system of Table 8 is one-half wavelength at the design wavelength.

The six layer system has been described as a subdivision of the third layer and the details of Table 8 were computed on that basis. It could also be described as an embodiment in which the second layer was subdivided and further optimized. The choice of terminology concerning which layer is sub-divided is made on the basis that the third layer is substantially thicker than the second layer.

Any or all of the second, third and fourth layers of the embodiment of FIG. 6 may be subdivided into two or more layers. The layer having the highest refractive index, however, should be adjacent the first layer. The best result may be obtained when the remaining layers decrease in refractive index in the direction towards the substrate. Subdivision beyond six layers, however, may yield only an insignificant improvement in performance.

It is possible to construct a six layer system similar to that of Table 8 but wherein the third layer has a lower refractive index than the second layer. Additionally, the fourth layer has a lower refractive index than the second layer but higher than the fifth layer. The optical performance of such a system may be inferior to an embodiment in which the refractive index of the third layer is greater than that of the fourth layer. However, there may be increased economy of production or some advantageous physical property which makes the compromise worthwhile.

If a system is constructed according to the present invention with six or more layers as a result of subdividing the third layer of the five layer system into separate layers, the sequence of the refractive indices of the sub-layers may be in any order. However, none of the layers comprising the subdivision of the third layer should have a refractive index higher than the second layer or lower than the next to last layer. As noted above, the best optical result may be obtained when the refractive index of the layers forming the subdivision of the third layer decrease towards the substrate.

Generally, the combined optical thickness of the second and third layers of the present invention, or the combined optical thickness of any layers forming a subdivision of the second and third layers, when optimized to provide the lowest possible reflection over the visible spectrum, will be about one-half wavelength at the design wavelength.

As discussed above, transparent electrically conductive materials may include aluminum doped zinc oxide, antimony doped tin oxide, cadmium tin oxide, or indium tin oxide. Properties and preparation methods for such materials are well known in the art. Such materials may have a refractive index of about 2.0. As such, a transparent conductive layer formed from one or more such materials may be incorporated in any of the above described embodiments of the present invention. The layer may be located in the same position in which an non-conductive layer having a refractive index of about 2.0 (for example a zinc oxide layer having a refractive index of about 2.01) would be located. In a five layer embodiment as exemplified in Table 3 such a layer would be the third layer. In a six layer embodiment as exemplified in Table 8, the fourth layer may be a conductive layer. In a six layer embodiment wherein the refractive index sequence of the third and fourth layers is the reverse of the sequence shown in Table 8 the conductive layer may be the third layer.

When conductive layers are substituted for non-conductive layers in embodiments of the present invention described above, the layer system is preferably reoptimised, that is, layer thicknesses are adjusted to accomodate the specic refractive index value of the conductive layer.

The sheet resistance which may be achieved using a conductive layer as described, will depend on the thickness of the layer, the material selected for the layer, process parameters used in the layer deposition, and any annealing process which may be applied to the conductive layer after it is deposited. Generally a six layer embodiment of the present invention may have a sheet resistance of less than about five-thousand ohms per square. A five layer embodiment of the present invention may have a sheet resistance less than about two-thousand ohms per square.

It may be possible to construct any of the above described embodiments by using sequences of two or more thinner layers in place of the first layer, the last layer or the next to last layer. Such substitutions are known to those skilled in the art, and they are sometimes referred to as Herpin substitutions. An example of this technique is provided in U.S. Pat. No. 3,565,509. The use of such substitutions is possible without deviating from the principles of the present invention.

Figure 8:
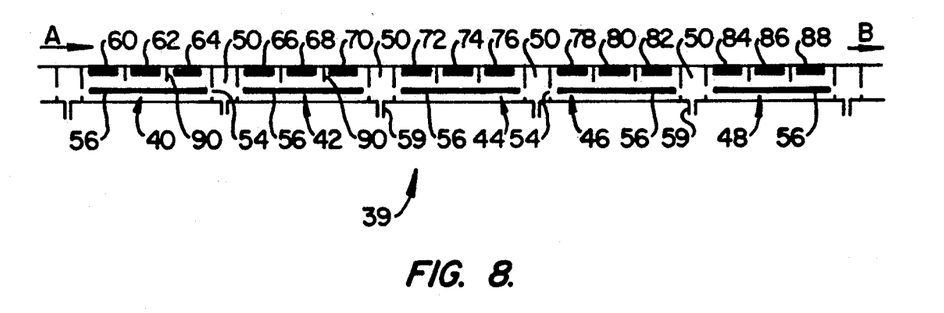
FIG. 8 schematically illustrates an in-line sputtering system.

Layer systems according to the present invention may be deposited in an in-line sputtering system of the type shown in FIG. 8. The machine may be a D1 system available from Airco Coating Technology of Fairfield, Calif. The machine 39 may comprise a series of five coating chambers 40, 42, 44, 46, and 48 connected by dynamic vacuum locks 50. The locks 50 have apertures or tunnels 54 to allow the passage of the substrates 56 therethrough. The chambers are evacuated by vacuum pumps (not shown) through ports or connections 59 and apertures 54. The substrates 56 to be coated are introduced into the machine at the end thereof indicated by arrow A. The entrance lock and buffer chamber by which the substrates are introduced are also not shown. The coated substrates are removed from the chamber at the end indicated by the arrow B. The exit lock by which the substrates are removed is not shown.

Fifteen sputtering cathodes 60, 62, 64, 66, 68, 70, 72, 74, 76, 78, 80, 82, 84, 86, and 88 may be located in groups of three in each of chambers 40, 42, 44, 46, and 48. The cathodes may be separated by divider screens 90. Each of the chambers 40, 42, 44, 46, and 48 may have a different sputtering pressure and a different gas mixture which is admitted to the chambers through flow controllers (not shown). During the deposition process, substrates 56 move continuously under the cathodes. The faster the cathodes are able to deposit material, the faster the substrates may move through the machine to deposit a given system. The transport speed, referred to as the line speed, of the substrates is held constant. Cathode power is adjusted to yield the desired thickness of a given layer in the system being deposited.

Specific examples of possible cathode configurations and powers for the above described machine 39 are given below. The assumption has been made that the maximum power for any cathode may be about 50 kilowatts (kw). The assumption has also been made that all fifteen cathodes are used. Silicon dioxide layers are assumed to be sputtered from rotating cylindrical magnetrons. Titanium dioxide and zinc oxide layers are assumed to be sputtered from planar magnetrons.

For the layer system of Table 1 (a prior art layer system), the fourth and third layers may be sputtered in chamber 40. Cathodes 60 and 62 may be used to sputter titanium dioxide and cathode 64 may be used to sputter silicon dioxide. The second layer may be sputtered in chambers 42, 44, and 46 using cathodes 66, 68, 70, 72, 74, 76, 78, 80, and 82, and in chamber 48 using cathode 84. The first layer may be sputtered in chamber 48 using cathodes 86 and 88. For the titanium dioxide layers, cathodes 60 and 62 may each be operated at about 27 kw and cathodes 66, 68, 70, 72, 74, 76, 78, 80, 82 and 84 may each be operated at about 49 kw.

For the silicon dioxide layers, cathode 64 may be operated at about 35 kw and cathodes 86 and 88 may be operated at about 42. kw. The layer system may be deposited at a line speed of about 31 inches per minute.

For the layer system of Table 3 (an embodiment of the present invention), the fifth and fourth layers may be sputtered in chamber 40 and 42. Cathodes 60 and 62 may be used to sputter titanium dioxide, and cathodes 64 and 66 may be used to sputter silicon dioxide. The third layer may be sputtered in chamber 42 using cathodes 68 and 70. The second layer may be sputtered in chambers 44 and 46 using cathodes 72, 74, 76, 78, and 80. The first layer may be sputtered in chamber 46 and 48 using cathodes 82, 84, 86, and 88. For the titanium dioxide layers, cathodes 60 and 62 may each be operated at about 28 kw, and cathodes 72, 74, 76, 78, and 80 each may be operated at about 45 kw. For the silicon dioxide layers, cathodes 64 and 66 may be operated at about 43 kw, and cathodes 82, 84, 86, and 88 may be operated at about 49 kw. The layer system may be deposited at a line speed of about 67 inches per minute.

It is notable that the total power consumed to deposit the prior art system may be about 665 kw. The system according to the present invention may be deposited at a line speed more than twice as fast (67 vs. 31 inches per minute) with a total power consumption of only 620 kw.

Faster production rate may make possible significant energy savings. By way of example, if a given area of antireflection coated product using a prior art layer system requires a two shift-per-day operation to maintain production capacity equal to demand, the same area of product using a layer system of the present invention may require only one-shift-per day operation. Thus energy savings of about seven-thousand kilowatt hours (KWH) per day may be possible.

The present invention has been described in terms of a number of embodiments. The invention however is not limited to the embodiments depicted and described. Rather the scope of the invention is defined by the appended claims.

What is claimed is:

1. An antireflection coating for a substrate, comprising: five adjoining layers, said layers designated the first, second, third, fourth, and fifth in consecutive numerical order beginning with the layer farthest from said substrate; said first layer having a refractive index less than the refractive index of said substrate and an optical thickness of about 0.25 $\lambda_0$; said second layer having a refractive index greater than about 2.20 and an optical thickness less than about 0.25 $\lambda_0$; said third layer having a refractive index less than said second layer and an optical thickness between about 0.25 $\lambda_0$ and 0.5 $\lambda_0$, said third layer including a transparent electrically conductive material; said fourth layer having a refractive index less than that of said third layer and an optical thickness less than about 0.25 $\lambda_0$; said fifth layer having a refractive index greater than the refractive index of said substrate and said fourth layer, and an optical thickness less than about 0.25 $\lambda_0$; and $\lambda_0$ being between about 480 nm and 560 nm.

2. The coating of claim 1 wherein said third layer includes in contact with said second layer, a first sub-layer having a refractive index less than that of said second layer, and in contact with said first sub-layer and said fourth layer, a second sub-layer having a refractive index less than that of said first sub-layer and greater than that of said fourth layer.

3. The coating of claim 1 wherein said third layer includes in contact with said second layer, a first sub-layer having a refractive index less than that of said second layer and greater than that of said fourth layer, and in contact with said first sub-layer and said fourth layer, a second sub-layer having a refractive index greater than that of said first sub-layer and less than that of said second layer.

4. The coating of claim 1 wherein said third layer includes at least two sub-layers each having a refractive index less than that of said second layer and greater than that of said fourth layer.

5. The coating of claim 1 wherein at least one layer includes at least two sub-layers.

6. The coating of claim 1 wherein said transparent electrically conductive material is selected from the group consisting of aluminum doped zinc oxide, antimony doped tin oxide, cadmium tin oxide, and indium tin oxide.

7. An antireflection coating for a substrate, comprising: six adjoining layers, said layers being designated the first, second, third, fourth, fifth, and sixth in consecutive numerical order beginning with the layer farthest from said substrate; said first layer having a refractive index less than that of said substrate and an optical thickness of about 0.25 $\lambda_0$; said second layer having a refractive index greater than about 2.2; said third layer having a refractive index less than that of said second layer; said fourth layer having a refractive index less than the refractive index of said third layer and said fourth layer including a transparent electrically conductive material; said fifth layer having a refractive index less than that of said fourth layer and having an optical thickness less than about 0.25 $\lambda_0$; said sixth layer having a refractive index greater than that of said substrate and greater than that of said fifth layer and an optical thickness less than about 0.25 $\lambda_0$; said second, third, and fourth layers having a combined optical thickness of about 0.5 $\lambda_0$, and $\lambda_0$ being between about 480 and 560 nm.

8. The coating of claim 7 wherein said transparent electrically conductive material is selected from the group consisting of aluminum doped zinc oxide, antimony doped tin oxide, cadmium tin oxide, and indium tin oxide.

9. An antireflection coating for a substrate, comprising: six adjoining layers, said layers being designated the first, second, third, fourth, fifth and sixth in consecutive numerical order beginning with the layer farthest from said substrate; said first layer having a refractive index less than that of said substrate and an optical thickness of about 0.25 $\lambda_0$; said second layer having a refractive index greater than about 2.2; said third layer having a refractive index less than that of said second layer and said third layer including a transparent electrically conductive material; said fourth layer having a refractive index greater than that of said third layer and less than that of said second layer; said fifth layer having a refractive index less than that of said fourth layer and an optical thickness less than about 0.25 $\lambda_0$; said sixth layer having a refractive index greater than that of said substrate and said fifth layer and an optical thickness less than about 0.25 $\lambda_0$; said second, third, and fourth layers having a combined optical thickness of about 0.5 $\lambda_0$, and $\lambda_0$ being between about 480 nm and 560 nm.

10. The coating of claim 9 wherein said transparent electrically conductive material is selected from the group consisting of aluminum doped zinc oxide, antimony doped tin oxide, cadmium tin oxide, and indium tin oxide.

11. An antireflection coating for a substrate, comprising: four adjoining layers, said layers being designated the first, second, third, and fourth in consecutive numerical order beginning with the layer farthest from said substrate; said first layer having a refractive index less than that of said substrate and an optical thickness of about 0.25 $\lambda_0$; said fourth layer having a refractive index greater than that of said substrate and an optical thickness less than about 0.25 $\lambda_0$; said third layer having an optical thickness of about 0.25 $\lambda_0$ and a refractive index less than that of said fourth layer; said second layer having a thickness of about 0.5 $\lambda_0$ and including at least two adjacent sub-layers, the sub-layer in contact with said first layer having a refractive index greater than about 2.2 and all other sub-layers having a refractive index of said third layer, and $\lambda_0$ being between about 480 nm and 560 nm and at least one of said other sublayers including a transparent electrically conductive material.

12. The coating of claim 11 wherein said transparent electrically conductive material is selected from the group consisting of aluminum doped zinc oxide, antimony doped tin oxide, cadmium tin oxide, and indium tin oxide.

13. An antireflection coating for a substrate, comprising: five adjoining layers, said layers being designated the first, second, third, fourth, and fifth in consecutive numerical order beginning with the layer farthest from said substrate; said first layer having a refractive index of about 1.46 at a wavelength $\lambda_0$ and an optical thickness of about 0.266 $\lambda_0$; said second layer having a refractive index of about 2.35 at a wavelength $\lambda_0$ and an optical thickness of about 0.110 $\lambda_0$; said third layer having a refractive index of about 2.01 at a wavelength $\lambda_0$ and an optical thickness of about 0.368 $\lambda_0$, said third layer including a transparent electrically conductive material; said fourth layer having a refractive index of about 1.46 at a wavelength $\lambda_0$ and an optical thickness of about 0.117 $\lambda_0$; said fifth layer having a refractive index of about 2.35 at a wavelength $\lambda_0$ and an optical thickness of about 0.028 $\lambda_0$, and $\lambda_0$ being about 510 nm.

14. The coating of claim 13 wherein said transparent electrically conductive material is selected from the group consisting of aluminum doped zinc oxide, antimony doped tin oxide, cadmium tin oxide, and indium tin oxide.

15. An antireflection coating for a substrate, comprising: six adjoining layers, said layers being designated the first, second, third, fourth, fifth, and sixth in consecutive numerical order beginning with the layer farthest from said substrate; said first layer having a refractive index of about 1.46 and an optical thickness of about 0.268 $\lambda_0$; said second layer having a refractive index of about 2.35 and an optical thickness of about 0.072 $\lambda_0$; said third layer having a refractive index of about 2.14 and an optical thickness of about 0.170 $\lambda_0$; said fourth layer having a refractive index of about 2.01 and an optical thickness of about 0.270 $\lambda_0$, said fourth layer including a transparent electrically conductive material; said fifth layer having a refractive index of about 1.46 and having an optical thickness of about 0.120 $\lambda_0$; said sixth layer having a refractive index of about 2.35 and an optical thickness of about 0.030 $\lambda_0$; and $\lambda_0$ being about 510 nm.

16. The coating of claim 15 wherein said transparent electrically conductive material is selected from the group consisting of aluminum doped zinc oxide, antimony doped tin oxide, cadmium tin oxide, and indium tin oxide.

* * * * *

UNITED STATES PATENT AND TRADEMARK OFFICE
CERTIFICATE OF CORRECTION

PATENT NO. : 5,270,858
DATED : December 14, 1993
INVENTOR(S) : Eric R. Dickey

It is certified that error appears in the above-indentified patent and that said Letters Patent is hereby corrected as shown below:

On title page, under "Related U.S. Application Data": change "Dec. 11" to --Oct. 11--.
Column 4, line 58: replace "coatings" with --coating--.
Column 5, line 4: after "may" insert --be--.
Column 8, line 10: replace "photopic" with --photoptic--.
Column 11, line 7: replace "accomodate" with --accommodate--.
Column 11, line 8: replace "specic" with --specific--.
Column 14, line 30: after "index" insert --less than about 2.2 but greater than the refractive index--.

Signed and Sealed this

Fourth Day of April, 1995

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,270,858
DATED : December 14, 1993
INVENTOR(S) : Eric R. Dickey

It is certified that error appears in the above-indentified patent and that said Letters Patent is hereby corrected as shown below:

On the title page, after item [76] Inventor: inser the following:

--[73] Assignee: Viratec Thin Flims, Inc.
2150 Airport Drive
Fairbault, Minnesota--.

Signed and Sealed this

Twentieth Day of June, 1995

*Attest:*

BRUCE LEHMAN

*Attesting Officer*     *Commissioner of Patents and Trademarks*